United States Patent
Kalakrishnan et al.

(10) Patent No.: US 10,035,264 B1
(45) Date of Patent: Jul. 31, 2018

(54) REAL TIME ROBOT IMPLEMENTATION OF STATE MACHINE

(71) Applicant: X Development LLC, Mountain View, CA (US)

(72) Inventors: Mrinal Kalakrishnan, Palo Alto, CA (US); Torsten Kroeger, Los Altos Hills, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 174 days.

(21) Appl. No.: 14/797,529

(22) Filed: Jul. 13, 2015

(51) Int. Cl.
*B25J 9/00* (2006.01)
*B25J 9/16* (2006.01)
*G05D 1/02* (2006.01)
*H04W 4/80* (2018.01)

(52) U.S. Cl.
CPC .............. *B25J 9/163* (2013.01); *G05D 1/028* (2013.01); *H04W 4/80* (2018.02); *G05D 2201/0207* (2013.01)

(58) Field of Classification Search
CPC .......... G05B 2219/39322; G05B 2219/39331; G05B 2219/39329; G05B 2219/39333; B25J 9/1633; B25J 9/163; B25J 9/1664; B25J 9/1687; B25J 9/1628; B25J 9/1656; B25J 9/1658; B25J 9/1661
See application file for complete search history.

(56) References Cited

U.S. PATENT DOCUMENTS

| | | |
|---|---|---|
| 4,835,730 A | 5/1989 | Shimano et al. |
| 5,336,982 A | 8/1994 | Backes |
| 5,341,459 A | 8/1994 | Backes |
| 7,313,463 B2 | 12/2007 | Herr et al. |
| 7,657,345 B2 | 2/2010 | Endo et al. |
| 8,290,619 B2 | 10/2012 | McLurkin et al. |

(Continued)

OTHER PUBLICATIONS

Manchester, I. R., & Umenberger, J. (May 2014). Real-time planning with primitives for dynamic walking over uneven terrain. In Robotics and Automation (ICRA), 2014 IEEE International Conference on (pp. 4639-4646). IEEE.

(Continued)

*Primary Examiner* — Adam R Mott
(74) *Attorney, Agent, or Firm* — Middleton Reutlinger

(57) ABSTRACT

Methods, apparatus, systems, and computer-readable media are provided for real time robot implementation of state machines. In various implementations, a robot controller may state machine data indicative of a state machine to be implemented by the robot controller while operating a robot. The robot controller may identify one or more states reachable by the robot controller during implementation of the state machine. At least a first state of the one or more states may include: a first action to be performed by the robot while the robot controller is in the first state; and a plurality of strategies to govern performance of the first action under multiple circumstances while the robot controller is in the first state. The robot controller may operate the robot to perform the first action in a manner governed by a first strategy of the plurality of strategies. The robot controller may operate the robot to continue performing the first action in a manner governed by a second strategy of the plurality of strategies in response to a sensor signal.

17 Claims, 7 Drawing Sheets

(56) References Cited

U.S. PATENT DOCUMENTS

| | | | |
|---|---|---|---|
| 2006/0111811 A1* | 5/2006 | Okamoto | B25J 5/007 700/214 |
| 2008/0147206 A1 | 6/2008 | Zahrai et al. | |
| 2009/0069942 A1* | 3/2009 | Takahashi | B25J 9/1633 700/260 |
| 2010/0057255 A1 | 3/2010 | Ra et al. | |
| 2013/0050121 A1 | 2/2013 | Bruemmer | |
| 2013/0312000 A1 | 11/2013 | Helander et al. | |
| 2014/0204103 A1 | 7/2014 | Beer-gingold et al. | |
| 2014/0298231 A1* | 10/2014 | Saito | G06F 3/0484 715/771 |

OTHER PUBLICATIONS

Frazzoli, E., Dahleh, M. A., & Feron, E. (2005). Maneuver-Based Motion Planning for Nonlinear Systems With Symmetries. Robotics, IEEE Transactions on, 21(6), 1077-1091.

Lee, D., & Ott, C. (2011) Iterative Motion Primitive Learning and Refinement by Compliant Motion Control. http://robot.cmpe.boun.edu.tr/~cmericli/Humanoids2010-HRLHI/files/Submission03.pdf, 6 pages.

Stuckler, J., Holz, D., & Behnke, S. (2012). Demonstrating Everyday Manipulation Skills in RoboCup@ Home. IEEE Robotics and Automation Magazine, 34-42.

Frazzoli, E., Dahleh, M., & Feron, E. (2001). Real-time motion planning for agile autonomous vehicles. In American Control Conference, 2001. Proceedings of the 2001 (vol. 1, pp. 43-49). IEEE.

Mitter, S. K. (2012). Mathematical control theory. J. B. Baillieul, & J. C. Willems (Eds.). Springer Science & Business Media.

* cited by examiner

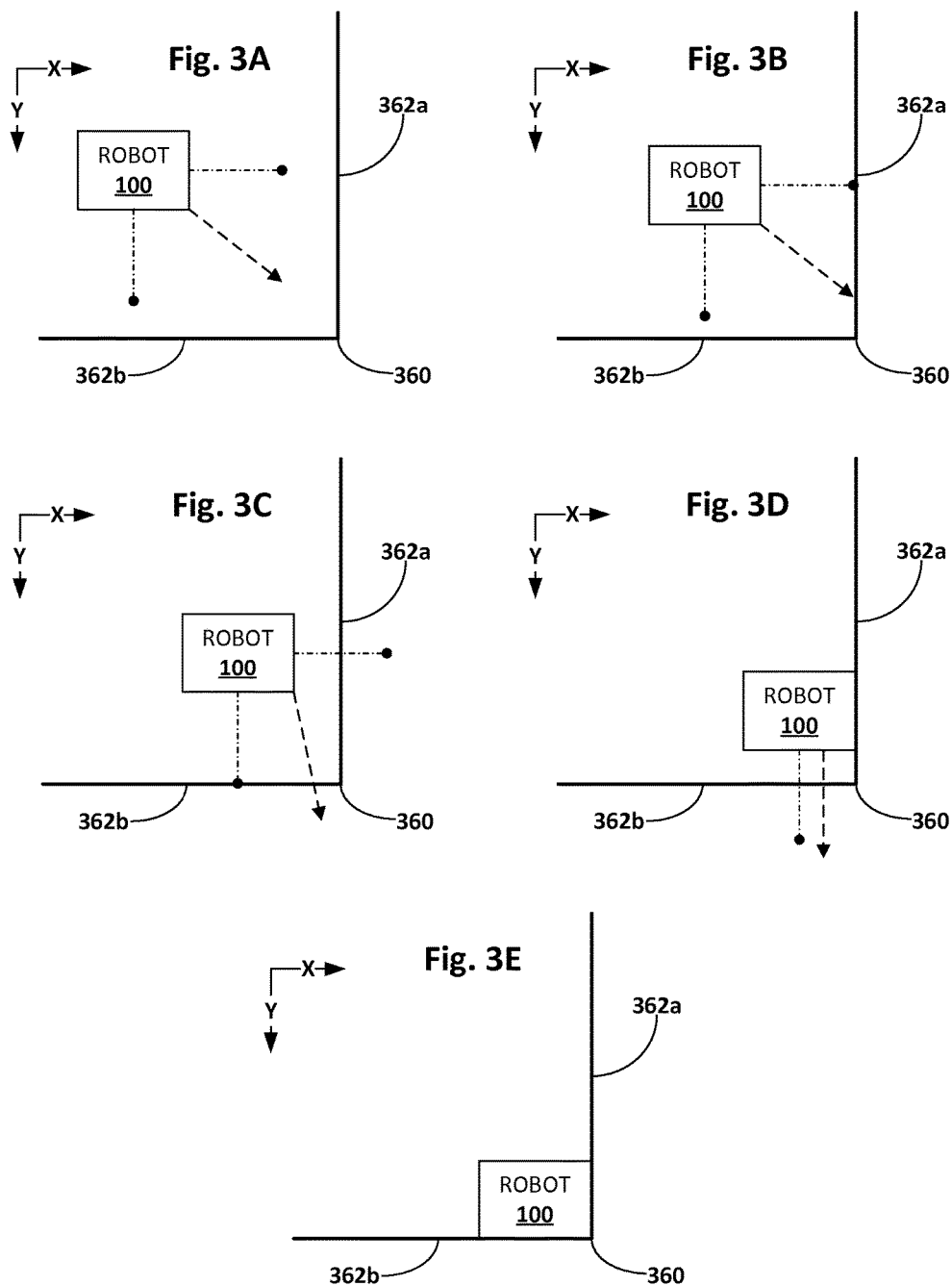

REAL TIME ROBOT IMPLEMENTATION OF STATE MACHINE

BACKGROUND

Robots may be configured to perform a variety of individual tasks, and may also be configured to perform a sequence of tasks in a manner determined by a state machine, e.g., in response to various sensor signals. In many instances, a manner in which a robot transitions between states of a state machine may be determined by one or more processors that are remote from the robot and/or that are not capable of traversing the state machine and causing the robot to perform corresponding tasks in real time. While many robots include what are known as "real time processors," existing techniques for interacting with these real time processors to control robots may be highly complex and/or granular.

SUMMARY

The present disclosure is generally directed to methods, apparatus, and computer-readable media (transitory and non-transitory) for providing robots with state machines that dictate how the robot performs a series of actions. Each state of the state machine may include an action to be performed by a robot and multiple intrastate (and in many cases, intra-degree-of-freedom-of-movement) "strategies" that govern performance of the action by the robot under multiple scenarios. For example, a first strategy may govern how a robot moves its end effector along one degree of freedom of movement in order to move the end effector towards a destination while a force sensor provides no signal. Once the force signal provides a signal (e.g., in response to the end effector making contact with a surface), however, then a second strategy may supersede the first strategy (i.e. take over) and govern how the robot continues to move its end effector along the degree of freedom of movement. Associating multiple intrastate strategies with a state may enable an action associated with the state to be relatively complex (e.g., "move robot to corner" rather than "move robot to first wall; then move robot to second wall"), and less granular than, for instance, traditional robot motion primitives.

In some implementations, a computer implemented method may be provided that includes the steps of: receiving, at a robot controller, state machine data indicative of a state machine to be implemented by the robot controller while operating a robot; and identifying, by the robot controller, based on the state machine data, one or more states reachable by the robot controller during implementation of the state machine. At least a first state of the one or more states includes: a first action to be performed by the robot while the robot controller is in the first state; and a plurality of strategies to govern performance of the first action under multiple circumstances while the robot controller is in the first state. The method may further include operating, by the robot controller, the robot to perform the first action in a manner governed by a first strategy of the plurality of strategies; and operating, by the robot controller, in response to a sensor signal, the robot to continue performing the first action in a manner governed by a second strategy of the plurality of strategies.

This method and other implementations of technology disclosed herein may each optionally include one or more of the following features.

In various implementations, the robot controller may be a real time controller. In various implementations, the first state further includes an exit condition, and the method further includes: determining, by the robot controller, that the exit condition is satisfied; and transitioning, by the robot controller, in a single cycle of the robot controller, the robot controller from the first state to a second state of the state machine in response to determining that the exit condition is satisfied, wherein the second state of the state machine includes a second action to be performed by the robot while in the second state.

In various implementations, the second strategy may be selected based on an origin of the sensor signal or based on a magnitude associated with the sensor signal. In various implementations, the plurality of strategies associated with the first state may include: at least two strategies associated with a first degree of freedom of movement of a component of the robot; and one or more strategies associated with a second degree of freedom of movement of the component. In various implementations, the first and second strategies govern how the robot exploits the first degree of freedom of movement of the component of the robot while the robot performs the first action, and at least one other strategy governs how the robot exploits the second degree of freedom of movement of the component of the robot while the robot performs the first action.

In various implementations, the robot performs the first action in the manner governed by the first strategy until a sensor begins producing the sensor signal in response to a physical interaction between the robot and an environment in which the robot operates. In various implementations, operating the robot to continue performing the first action in the manner governed by the second strategy may include performing the first action in a manner governed at least in part by the sensor signal.

Other implementations may include a non-transitory computer readable storage medium storing instructions executable by a processor to perform a method such as one or more of the methods described above. Other implementations may include a robot and/or robot controller configured to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 3A-E depict an example of how a robot may be operated using state machines configured with selected aspects of the present disclosure, in accordance with various implementations.

DETAILED DESCRIPTION

Figure 1:
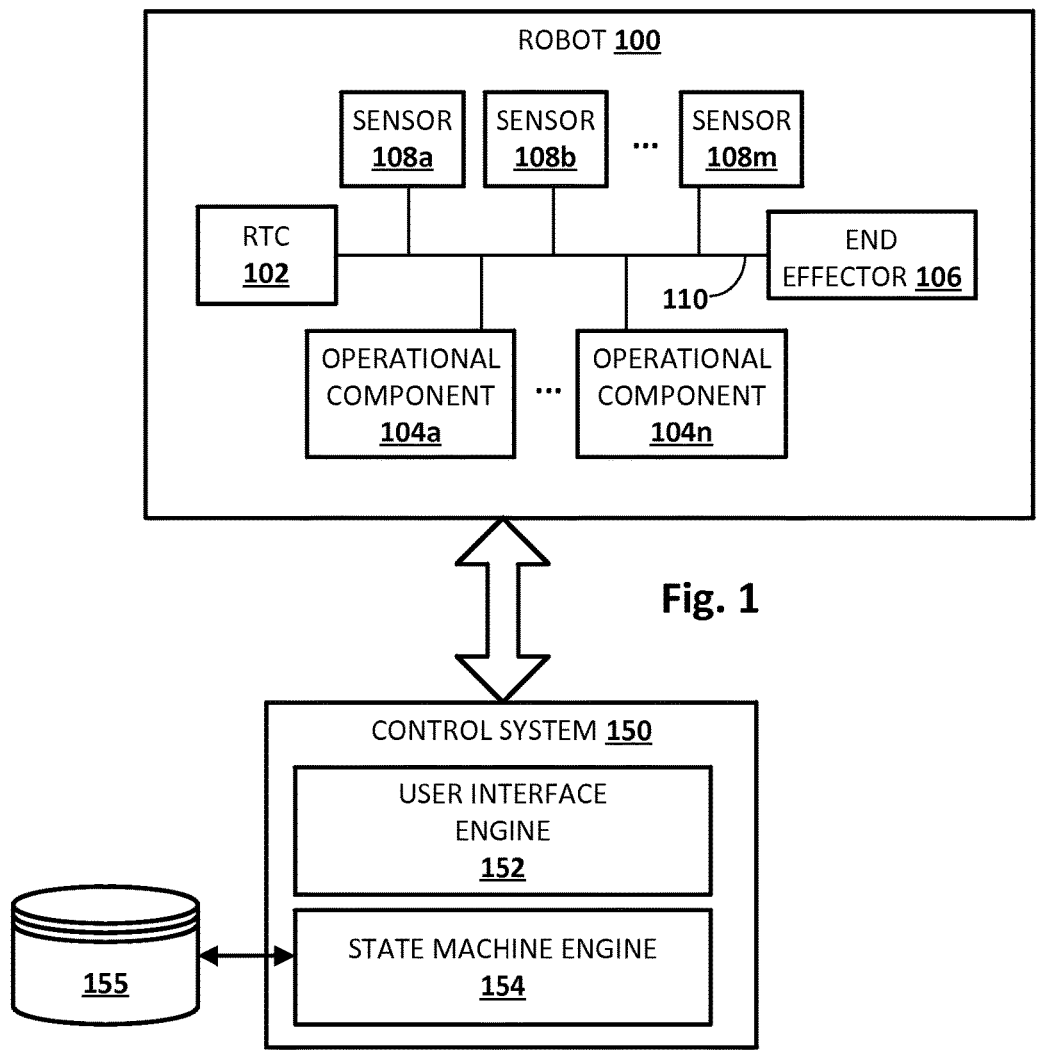
FIG. 1 schematically depicts an example environment in which disclosed techniques may be employed, in accordance with various implementations.

FIG. 1 is a schematic diagram of an example environment in which selected aspects of the present disclosure may be implemented in accordance with various implementations. A robot 100 may be in communication with a control system 150. Robot 100 may take various forms, including but not limited to a robot arm, a humanoid, an animal, an insect, an aquatic creature, a wheeled device, a submersible vehicle, an unmanned aerial vehicle ("UAV"), and so forth. In various implementations, robot 100 may include one or more robot controllers, such as a real time controller 102 ("RTC" in FIG. 1). As used herein, a "real time controller" may include one or more processors configured to perform operations subject to various so-called "real time constraints." For example, in some implementations, real time controller 102 may guarantee that robot 100 responds to various events, such as commands, sensors signals, etc., within a specific number of cycles of the real time processor, or within specific time constraints, e.g., milliseconds or even microseconds. In various implementations, real time controller 102 may be operably coupled with one or more operational components 104a-n, one or more end effectors 106, and/or one or more sensors 108a-m, e.g., via one or more buses 110.

As used herein, "operational components" 104 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

Sensors 108 may take various forms, including but not limited to light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While sensors 108a-m are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 6. In various implementations, control system 150 may be operated by a user to provide robot 100 with one or more high level actions, e.g., organized as a state machine. In various implementations, real time controller 102 on robot 100 may cause robot 100 to implement the state machine, e.g., by translating one or more high level actions into commands for various operational components 104 of robot. In some implementations, real time controller 102 may transition between various states of the state machine based on satisfaction of so-called "exit conditions" associated with each state. As will be discussed in more detail below, these exit conditions may be satisfied, for instance, based on a variety of sensor signals that may be received by real time controller 102.

Various modules or engines may be implemented as part of control system 150 as software, hardware, or any combination of the two. For example, in FIG. 1, control system 150 includes a user interface engine 152 and a state machine engine 154. In various implementations, user interface engine 152 may be configured to enable user input of various commands or tasks for robot 100, and/or output of various data. In some implementations, user interface engine 152 may facilitate creation and/or editing of one or more state machines that may be used by real time controller 102 to control robot 100. State machine engine 154 may be operably coupled with an index 155 that contains one or more state machines that may have been created and/or edited with a user interface provided by user interface engine 152. In various implementations, a user may interact with user interface engine 152 to select one or more state machines, e.g., from index 155, to upload to real time controller 102 of robot 100.

In various implementations, control system 150 may provide, e.g., to real time controller 102 in response to a user command, state machine data (e.g., from index 155) indicative of a state machine to be implemented by real time controller 102 while operating robot 100. Based on the state machine data, real time controller 102 may identify one or more states reachable by real time controller 102 during implementation of the state machine. At least some of the states may include an action to be performed by robot 100 while real time controller 102 is in the state, and a variety of strategies to govern performance of the action under various circumstances while real time controller 102 is in the state.

One technical advantage of providing a relatively ungranular state machine (as mentioned above) is that a user without extensive robotic training may be able to create a state machine comprised of a plurality of states, each associated with an action that is intuitively understandable. Thus, as used herein, an "action" associated with a state refers to the result of an atomic command that a user may issue robot 100, e.g., as part of a state machine. For example, a user operating control system 150 may be provided with a library of atomic actions performable by robot 100, such as "move to corner," "move to edge," "trace edge," "move object from point A to point B," "act upon object using end effector," and so forth. Such actions may be translated, e.g., by real time controller 102, into a plurality of lower level commands (e.g., motion primitives) that may be issued, for instance, to individual operational components 104 so that the operational components 104 may collectively act together to cause robot 100 to implement the desired action.

Real time controller 102 may be configured to operate robot 100 to perform the action in a manner governed by a strategy selected from the various available strategies. In some implementations, an action associated with a state may include one or more robot motion primitives that are performed (if more than one, sequentially) in accordance with one or more of the variety of strategies associated with the state. Real time controller 102 may select a current governing strategy in response to various events, such as receipt of a sensor signal, receipt of a sensor signal having a magnitude that satisfies a threshold, and/or a determination that a signal comes from a particular origin. Examples of how sensor signals may dictate which strategy governs performance of an action by robot 100 will be explained below.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using real time controller 102 of robot 100.

Figure 2:
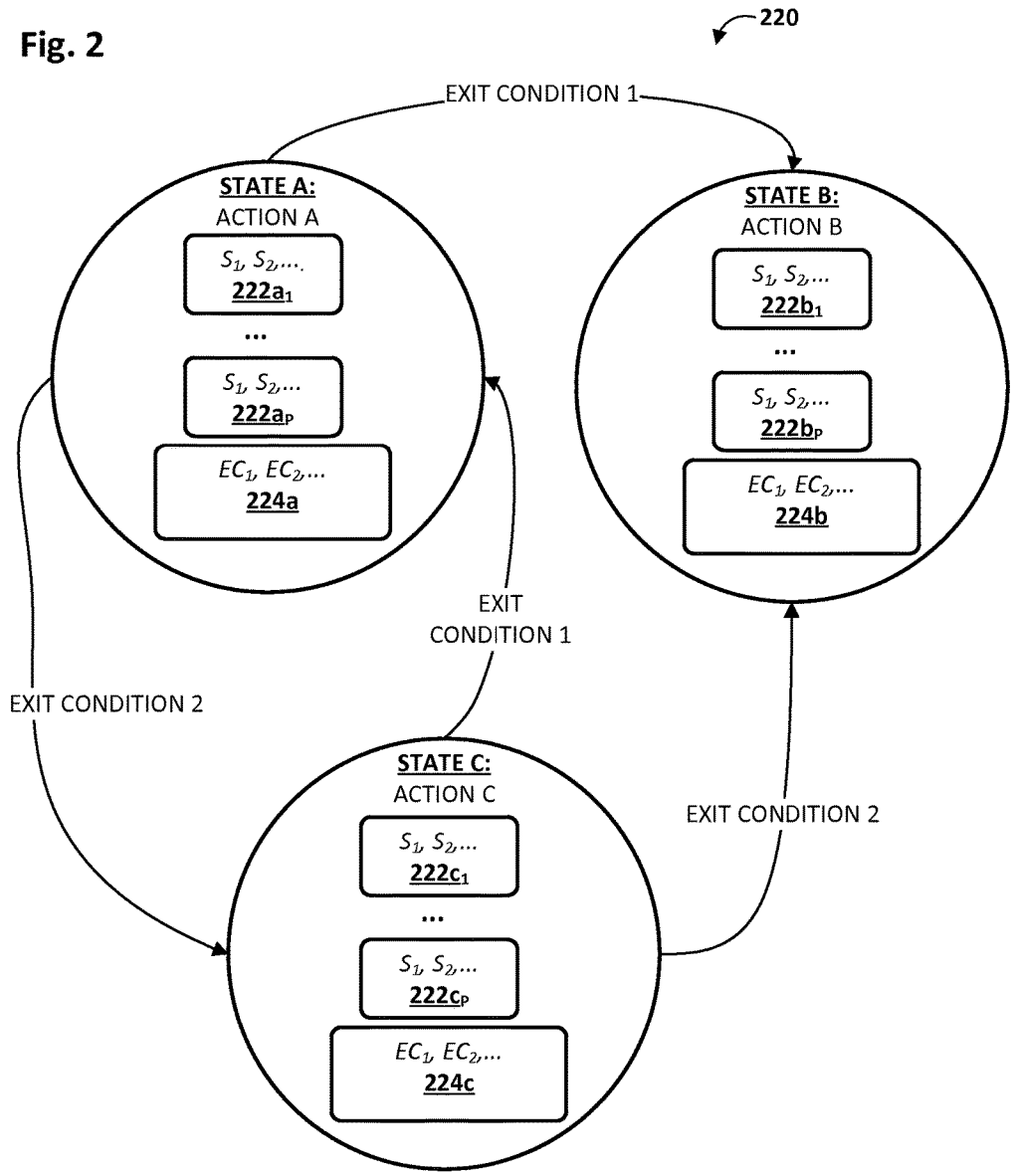
FIG. 2 schematically depicts an example state machine that may be created and utilized in accordance with various implementations.

FIG. 2 schematically depicts a simple example a state machine 220 that may be uploaded by control system 150 to real time controller 102 to operate robot 100. While depicted visually in FIG. 2, state machine 220 in reality may be conveyed using any number of proprietary or non-proprietary formats, such as descriptive languages, mark up languages (e.g., eXtensible Markup Language, or "XML"), various types of code, and so forth. In this example, state machine 220 includes three states: STATE A; STATE B, and STATE C. Each state of state machine 220 may include, e.g., for each degree of freedom of movement available to each component of the robot, a set of strategies 222 (e.g., "$S_1$, $S_2$ . . . "). Each state of state machine 220 may also include a respective set of exit conditions 224 (e.g., "$EC_1$, $EC_2$, . . . "). While three states are depicted in FIG. 2, this is not meant to be limiting. In various implementations, a state machine may include any number of states, including more or less than three.

A "strategy" as used herein may refer to one or more rules and/or constraints that govern how real time controller 102 causes robot 100 to perform a particular action associated with a particular state under a particular circumstance. If the circumstance changes, e.g., as detected by one or more sensors (e.g., the robot 100 makes contact with a surface), then the strategy used to govern how robot 100 continues to perform the action may also change. In this manner, real time controller 102 of robot 100 may perform a single action across multiple circumstances without having to transition between different states. This in turn enables users to create state machines with relatively few states and transitions between states, as each state may be relatively complex and/or less granular than, say, traditional robot motion primitives. In some implementations, robot 100 may even include a library of predefined states corresponding to a plurality of actions that robot 100 may take, so that a user without extensive knowledge of robots may be able to create a routine for robot 100 to perform that includes a sequence of these actions connected by logic.

As noted above, for each degree of freedom of movement available to robot 100, end effector 106, and/or operational components 104, multiple strategies 222 may be provided within a state to govern how robot 100 exploits that degree of freedom of movement under various circumstances. For example, in STATE A of FIG. 1, exploitation of a first degree of freedom of movement by a particular component may be governed by set of strategies $222a_1$, exploitation of a second degree of freedom of movement by the same component may be governed by set of strategies $222a_2$, exploitation of a first degree of freedom of movement by a different component may be governed by set of strategies $222a_P$, and so on.

Suppose end effector 106 has six degrees of freedom of movement in Cartesian space: along an X-axis (e.g., left and right); along a Y-axis (e.g., forward and reverse); along a Z-axis (e.g., up and down); roll; yaw; and pitch. A given state, such as STATE A, may have sets of strategies $222a_1$-$a_p$ that govern how each of these degrees of freedom of movement may be exploited by robot 100. For example, STATE A may have two or more strategies that govern how robot 100 moves a particular component along the X-axis, two or more strategies that govern how robot 100 moves the particular component along the Y-axis, two or more strategies that govern how robot 100 rolls the particular component about an axis of rotation, and so on. In addition to Cartesian space, a robot component may have degrees of freedom of movement in so-called "joint" space. Techniques described herein are equally applicable to either joint or Cartesian spaces. Thus, for each degree of freedom of movement a joint has in joint space, a given state may include a plurality of strategies for governing movement by that joint along that particular degree of freedom of movement.

Strategies 222 may come in a variety of forms depending on the action associated with the state, the operational component 104 being governed, and so forth. A relatively simple strategy may be a so-called "motion strategy" that governs how robot 100 moves a particular component along a particular degree of freedom of movement absent any other signal input. For example, if there is no signal input to indicate the robot component has had a physical interaction with its environment (e.g., come into contact with something or is near any obstacles), a default motion strategy for a degree of freedom of movement may dictate that robot 100 continue to simply move the robot component along the degree of freedom of movement at a first velocity. However, if it is determined, e.g., by real time controller 102 based on a range finder sensor, that robot 100 is within a certain distance of an environmental obstacle (static or dynamic), another motion strategy may supersede the first motion strategy and may dictate that robot 100 move the robot component along the same degree of freedom of movement at a different velocity (e.g., slower to minimize consequence of collision or faster to attempt to avoid collision with dynamic obstacle).

Another type of strategy may be a so-called "force" strategy that governs how robot 100 moves the particular component along the particular degree of freedom of movement when a signal from a force sensor is detected. For example, suppose the particular robot component contacts a surface (as indicated by a signal from a force sensor). A force strategy may thereafter dictate that the particular robot component move along the particular degree of freedom of movement in a manner that maintains a reciprocal force between the robot component and the surface within a predetermined range (e.g., more or less force may be acceptable, desirable, and/or necessary when contacting a rigid surface than when contacting a compliant surface). Other types of strategies may include but are not limited to so-called "impedance" strategies that govern how "stiffly" robot 100 operates components along particular degrees of freedom of movement, and/or so-called "torque" strategies that govern how robot 100 rotates one or more joints about various axes.

Degrees of freedom of movement associated with each component of a robot may be independent of degrees of freedom of movement associated with other components. Similarly, in some implementations, sets of strategies provided for each degree of freedom of movement of each robot component may also be independent of sets of strategies provided for other degrees of freedom of movement of the same or different robot components. In addition, in various implementations, governance of exploitation of a particular degree of freedom of movement by a particular component may shift between multiple strategies within a set of strategies depending on, for instance, sensor signals. This shifting is not limited to linear shifting. For example, a component's movement along a particular degree of movement in a particular state may be governed by strategies $S_1, S_2, \ldots$ in any order (e.g., $S_1 \rightarrow S_2 \rightarrow S_3 \ldots$ or $S_1 \rightarrow S_3 \rightarrow S_2 \ldots$), and the same strategy may be reinstated should circumstances dictate (e.g., sensor signals satisfy a threshold for that strategy).

It is possible that in some circumstances, more than one strategy may have conditions that are satisfied by current sensor signals, and hence it would be permissible to govern exploitation of a particular degree of freedom of movement of a particular robot component using multiple different strategies. To resolve which strategy should be selected to govern (assuming only one strategy can govern exploitation of a particular degree of freedom at a time), each strategy may have an associated priority. For example, a first strategy may govern exploitation of a particular degree of freedom of movement of a particular component when a sensor signal satisfies a first magnitude threshold, and a second strategy may govern when the sensor signal satisfies a second, higher magnitude threshold. When the sensor signal has a magnitude that satisfies both thresholds, then the first or second strategy (in this example, probably the second) may be selected to govern depending on which has the highest associated priority. In some implementations, for a given degree of freedom of movement in a state, a list of prioritized strategies may be provided. For each control cycle of real time controller 102, real time controller 102 may check conditions (e.g., thresholds) associated with each strategy on the list in order of priority. If the conditions for a particular strategy are met, that strategy may be applied. Otherwise, real time controller 102 may continue to check conditions of strategies further down the list.

Referring back to FIG. 2, exit conditions 224 ("$EC_1$, $EC_2, \ldots$" in FIG. 2) for each state may be satisfied, for instance, based on one or more sensor signals satisfying one or more thresholds, and may cause real time controller 102 to transition between states of state machine 220. For instance, while real time controller 102 is in STATE A, if exit condition 1 is satisfied, real time controller 102 may transition to STATE B. However, if exit condition 2 is satisfied, real time controller 102 may transition from STATE A to STATE C instead. Exit conditions may vary depending on the type of action associated with a state, and may be best explained using an example.

Suppose ACTION A associated with STATE A is "move robot to edge of raised surface." A raised surface could be, for instance, a tabletop or a roof. Exit condition 1 of STATE A may be satisfied on a determination, e.g., by real time controller 102 based on a signal from a drop off detection sensor, that robot 100 has reached an edge of a raised surface adjacent a drop off. Satisfaction of exit condition 1 of STATE A may cause real time controller 102 to transition to STATE B. ACTION B of STATE B may be, for instance, "turn XX degrees and travel along edge of raised surface" (e.g., for mapping purposes). Exit condition 2 of STATE A, on the other hand, may be satisfied on determination, e.g., by real time controller 102 based on a signal from a force sensor, that robot 100 has collided with a vertical surface (e.g., a chimney). Satisfaction of exit condition 2 of STATE A may cause real time controller 102 to transition to STATE C. ACTION C of STATE C may be, for instance, "navigate around detected obstacle to original trajectory."

Exit condition 1 of STATE C may be satisfied on a determination, e.g., by real time controller 102 based on a signal from a position and/or motion sensor, that robot 100 has resumed the trajectory of ACTION A of STATE A. Satisfaction of exit condition 1 of STATE C may cause real time controller 102 to transition back to STATE A, so that robot can resume its search for an edge of the raised surface. Exit condition 2 of STATE C, by contrast, may be satisfied on a determination, e.g., by real time controller 102 based on a signal from a drop off sensor of robot 100, that robot has reached an edged of the raised surface. Satisfaction of exit condition 2 of STATE C may cause real time controller 102 to transition to STATE B, where robot may turn and travel along the edge of the raised surface, e.g., for mapping purposes.

As noted above, motion of robot 100 along various degrees of freedom of movement may be independently governed by various strategies 222, depending on the circumstances. An example of such independent governance is demonstrated by FIGS. 3A-E, in which robot 100 is depicted schematically navigating towards a corner 360 defined by two walls, 362a and 362b. The dash-dot-dashed lines extending from robot along the X and Y axes represent a range of distance sensors on robot 100. The diagonal arrow extending down and to the right from robot 100 represents its actual movement towards corner 360. In this example, movement of robot 100 along the X and Y axes may be governed by the prioritized strategies set forth in Table 1, below.

TABLE 1

| | X axis | | Y axis | |
| --- | --- | --- | --- | --- |
| | Thresholds | Strategy | Thresholds | Strategy |
| 1 | Contact made along X axis | Force control | Contact made along Y axis | Force control |
| 2 | Distance sensor along X axis active | Distance control | Distance sensor along Y axis active | Distance control |
| 3 | Default/backup | Velocity control | Default/backup | Velocity control |

In this table, the strategies of row 1 ("Force control") may dictate that robot 100 attempt to apply a predetermined force to a surface such as a wall. The Force control strategies have highest priority, and govern when robot 100 makes contact with a surface such as a wall. The strategies of row 2 ("Distance control") may dictate that robot 100 approach a wall cautiously, e.g., at a velocity that is slower than the default "Velocity control" strategy. The Distance control strategies have second highest priority, and govern when robot 100 comes within a particular distance, e.g., a range of a distance sensor. The strategies of row 3 ("Velocity control") may dictate that robot 100 proceed along the respective axis at a particular velocity. The "Velocity control" strategies have lowest priority and govern when no force or distance signals are present.

In FIG. 3A, robot 100 has not yet contacted either wall. During a single control cycle, real time controller 102 may check each of the thresholds of the table above to determine that the thresholds for the X and Y axes for both rows 1 and 2 are not satisfied. Thus, the default/backup strategy of "Velocity control" may be used to govern movement of robot 100 along each axis to keep robot 100 moving down and to the right at a selected velocity.

Some number of control cycles later, robot 100 may come into range of first wall 362a, as indicated in FIG. 3B. At this point, the threshold of row 2 for the X axis may be satisfied because the distance sensor along the X axis may detect presence of first wall 362a. Accordingly, during this control cycle and until robot 100 makes contact with first wall 362a, real time controller 102 may govern movement of robot 100 along the X axis pursuant to the "Distance control" strategy. For example, a velocity of robot 100 along the X axis may be reduced. Movement of robot 100 along the Y axis may remain unchanged because second wall 362b is not yet in range.

Some number of control cycles later, when second wall 362b is in range of the distance sensor along Y axis as depicted in FIG. 3C, movement of robot 100 along the Y axis may likewise be governed by "Distance control" because the condition in row 2 of the Y axis strategies is now satisfied. Some number of control cycles later, in FIG. 3D, robot 100 makes physical contact with first wall 362a. This may cause a force sensor along the X axis to raise a signal, which in turn may satisfy the threshold of row 1 under the X axis. Accordingly, movement of robot 100 along the X axis during this control cycle (and future control cycles until contact with first wall 362a is lost) may now be governed by the "Force control" strategy, which dictates that robot 100 maintain some predetermined force with first wall 362a.

Downward movement along the Y axis may continue to be governed by the "Distance control" strategy of row 2 until robot 100 makes contact with second wall 362b as shown in FIG. 3E. During this control cycle, the "Force control" strategy of row 1 may take over movement of robot 100 along the Y axis so that robot maintains a predetermined force between itself and second wall 362b. In some instances, contact being made along both axes may constitute an exit condition that causes real time controller 102 to transition from one state ("move robot to corner") to another state.

Figure 4A:
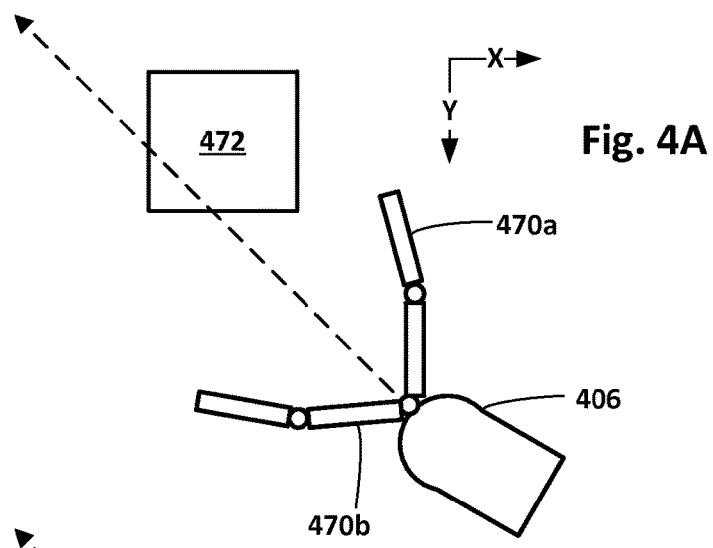
FIGS. 4A-E depict an example of how a robot end effector may be operated using state machines configured with selected aspects of the present disclosure, in accordance with various implementations.

Another example of how intrastate strategies may be employed is depicted in FIGS. 4A-E. A robot end effector 406 includes two opposing digits 470a and 470b. A robot (not depicted) to which end effector 406 is attached may be programmed with a state machine that includes a state with an action of "move towards and grab object 472." As depicted in FIG. 4A, at the outset when neither digit has made contact with object 472, end effector 406 may simply move up and to the left as shown by the dashed arrow. Simple movement strategies may govern movement along the X and Y axes, respectively, until one or more force sensors produces a force signal that indicates a digit 470 has made contact with object 472.

Figure 4B:
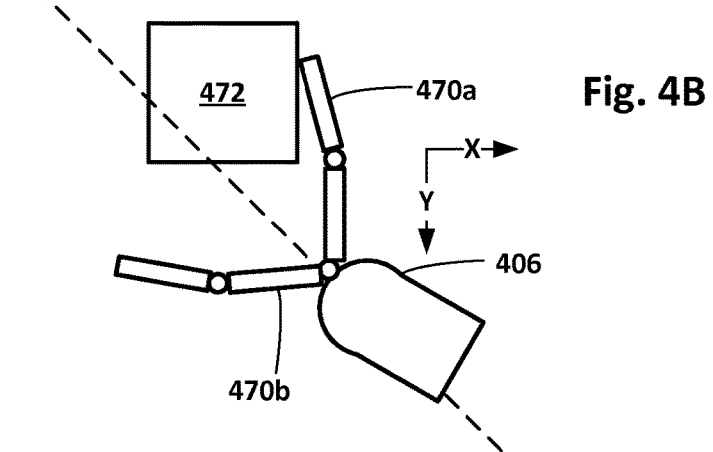

In FIG. 4B, first digit 470a has made contact with a right surface of object 472, but second digit 470b has not yet contacted a bottom surface of object 472. A force sensor may produce a signal indicative of the contact by first digit 470a. In response to that signal, a new strategy may govern movement of end effector 406 along the X axis to the left. That new strategy may dictate that further movement of end effector 406 to the left should be slow and/or performed with decreased stiffness, e.g., to avoid damaging object 472 or first digit 470a. Additionally, the new strategy may be controlled at least in part by a sensor that provides a signal indicative of mechanical resistance encountered by first digit 470a.

Figure 4C:
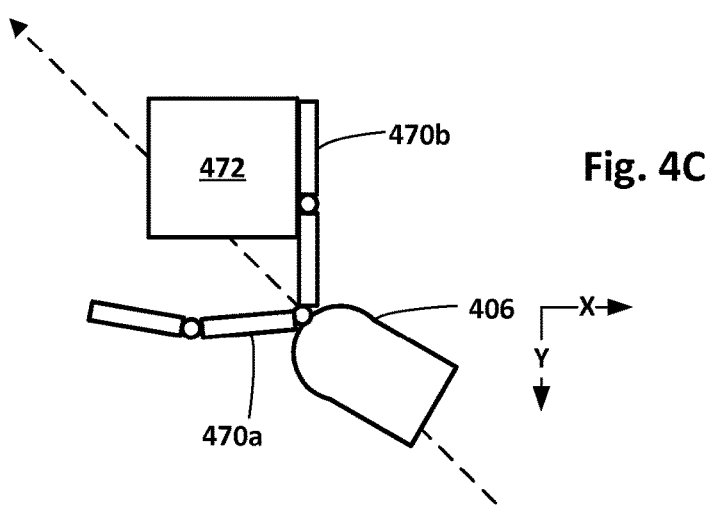

As shown in FIG. 4C, by continuing along the diagonal trajectory, reciprocal force between object 472 and first digit 470a is increased, causing first digit 470a to lose its bend and straighten out. Once first digit 470a is straightened out and has no more bend to give, reciprocal force between object 472 and first digit 470a may increase substantially (e.g., satisfying a threshold), which may cause yet another strategy governing movement of end effector 406 along the X axis to take over. This new strategy may dictate that so long as the reciprocal force between first digit 470a and object 472 satisfies the threshold, no additional movement along the X axis to the left is permitted.

Figure 4D:
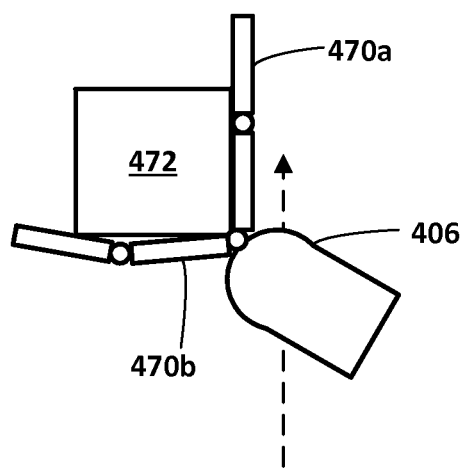
Figure 4E:
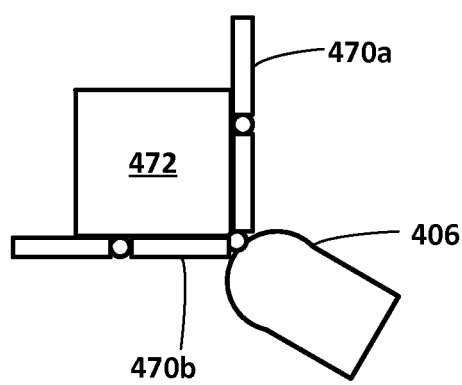

The dashed line in FIG. 4D represents movement of end effector 406 after first digit 470a is straightened against object 472 (and no more movement is permitted to the left), which is now straight up. Once second digit 470b contacts a bottom surface of object 472, a similar strategy transition may occur along the Y axis as was described above with respect to the X axis. A new strategy governing movement along the Y axis may dictate that further movement of end effector 406 upwards should be slow and/or performed with decreased stiffness, e.g., to avoid damaging object 472 or second digit 470b. Additionally, the new strategy may be controlled at least in part by a sensor that provides a signal indicative of mechanical resistance encountered by second digit 470b. Once second digit 470b loses its bend and reciprocal force between it and object 472 reaches a threshold, as depicted in FIG. 4E, no more upwards movement of end effector 406 may be permitted. At this point, end effector 406 may have a strong hold of object 472. The combination of signals indicating that reciprocal forces between both digits 470 and object 472 satisfy respective thresholds may also satisfy an exit condition of the state, and may cause transition to another state (e.g., "drop object off at new location").

Figure 5:
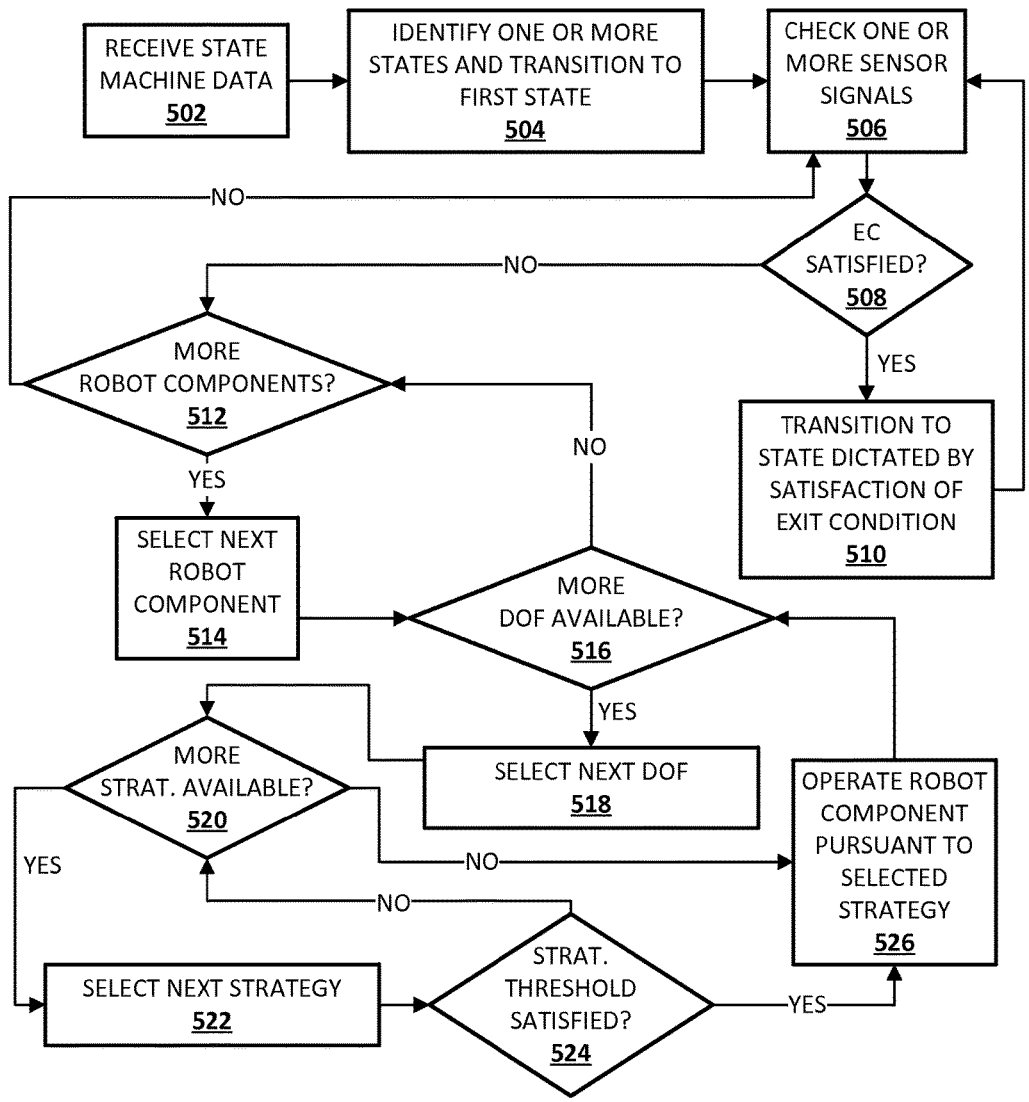
FIG. 5 depicts an example method for operating a robot with a state machine configured with selected aspects of the present disclosure, in accordance with various implementations.

Referring now to FIG. 5, an example method 500 of uploading a state machine to a robot and implementing the state machine in real time is described. For convenience, the operations of method 500 are described with reference to a system that performs the operations. This system may include various components of various computer systems, including computing elements of robot 100 and/or control system 150. Moreover, while operations of method 500 are shown in a particular order, this is not meant to be limiting. One or more operations may be reordered, omitted or added.

At block 502, the system may receive state machine data indicative of a state machine to be implemented by a robot controller (e.g., real time controller 102) while operating a robot (e.g., robot 100). For example, a user may operate control system 150 to create and/or edit a state machine, and may upload data indicative of the state machine (e.g., a descriptive file, one or more trees or graphs, etc.) to real time controller 102.

At block 504, the system may identify, based on the state machine data, one or more states reachable by the robot controller during implementation of the state machine, and may transition to a first state (e.g., a default, or start, state). As noted previously, in various implementations, at least one state of the state machine may include an action to be performed by the robot while the robot controller is in the first state, and a plurality of strategies to govern performance of the action under multiple circumstances while the robot controller is in the first state. In some implementations, operations associated with the remaining blocks, 506-526, may be implemented by real time controller 102 within a single control cycle.

At block 506, one or more sensor signals may be checked, e.g., at real time controller 102, against one or more thresholds associated with one or more exit conditions and/or intra-state, intra-degree-of-freedom-of-movement strategies. These sensor signals may be indicative of a variety of events, such as robot 100 travelling at a particular velocity, robot 100 coming into contact with an obstacle or object, robot 100 reaching an edge, robot 100 carrying a load having a particular mass, robot 100 coming into within a particular distance of something, and so forth. At block 508, the system may determine, based on the one or more signals checked at block 506, whether any exit conditions of the current state are satisfied. If the answer is yes, then method 500 may transition to block 510, and real time controller 102 may transition to another state of the state machine that is dictated by satisfaction of the exit condition.

If the answer at block 508 is no, then method 500 may proceed to block 512. At block 512, the system may determine whether there are any robot components (e.g., operational components 104) that have yet to be operated during the current control cycle. If the answer is yes, then at block 514, the system may select a robot component (e.g., a next component or a randomly-selected component). At block 516, the system may determine whether there are any degrees of freedom of movement ("DOF" in FIG. 5) for the component selected at block 514 that have not yet been exploited (assuming, of course, the current state action calls for such exploitation). If the answer is yes, then at block 518, a degree of freedom of movement may be selected (e.g., randomly or in a particular order).

At block 520, for the degree of freedom of movement selected at block 518, the system may determine whether there are any strategies that have yet to be considered. If the answer is yes, then the system may select a strategy at block 522. In some implementations, the system may select the strategy having the highest priority. At block 524, the system may determine whether one or more thresholds (or conditions) associated with the selected strategy are satisfied. If the answer at block 524 is yes, then the system may operate the robot to exploit the currently-selected degree of freedom of movement as dictated by an action associated with the current state of the state machine in a manner governed by the selected strategy. For example, while causing robot 100 to perform the state action, real time controller 102 may operate the currently selected robot component along the currently-selected degree of freedom of movement pursuant to the currently-selected strategy. If the answer at block 524 is no, however, then method 500 may proceed back to block 520, to determine if any more strategies are left to be considered for the currently-selected degree of freedom of movement. If the answer at block 520 is no, then the robot will be operated pursuant to the currently-selected strategy (which in effect is the de facto default or backup strategy) at block 526, and method 500 will proceed back to block 516.

Back at block 516, the system may determine whether there are any more degrees of freedom of movement for the currently-selected robot component to exploit as part of the robot performing the state action. If the answer is yes, then method 500 proceeds to block 518 to select another degree of freedom of movement, and blocks 520-526 are repeated for the newly-selected degree of freedom of movement. If, however, the answer at block 516 is no, then method 500 may proceed back to block 512, where the system may determine whether there are any additional robot components to operate for the current control cycle. If the answer is yes, then the next robot component is selected at block 514, and blocks 516-526 are repeated for the newly-selected robot component. However, if the answer at block 512 is no, then there are no more robot components to operate this control cycle, and method 500 may proceed back to block 506, at which sensor signals are checked once again, e.g., as part of the next control cycle.

Figure 6:
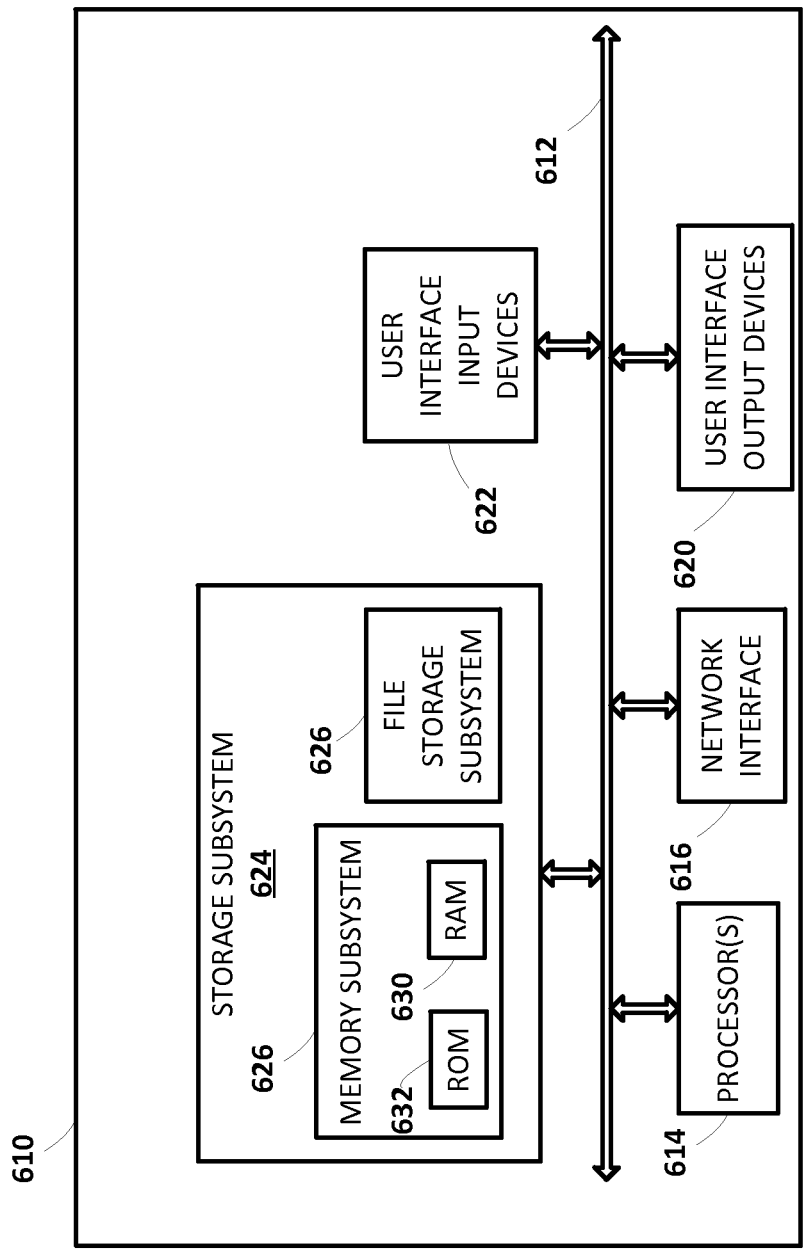
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of real time controller 102, user interface engine 152, and/or state machine engine 154. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for a robot to perform one or more high level user-selected actions, each corresponding to a state of a state machine, provided by a user at a computing device, wherein each of the states corresponds to a user-selected action, the method comprising:

receiving, at a real time controller integral with the robot, from the computing device, state machine data indicative of the state machine to be implemented autonomously by the real time controller while operating the robot, wherein the robot includes a plurality of independently controllable actuators;

identifying, by the real time controller, based on the state machine data, one or more of the states reachable by the real time controller during implementation of the state machine, wherein at least a first state of the one or more states includes:

a first high level user-selected action to be performed collectively by the plurality of independently controllable actuators of the robot while the real time controller is in the first state, wherein the first high level user-selected action was selected by the user from a library of user-selectable actions and corresponding states; and a plurality of distinct sets of multiple strategies associated with the first high level user-selected action, wherein each distinct set is assigned specifically to a respective actuator of the plurality of independently controllable actuators and governs translation of the first high level user-selected action into one or more lower level commands that are issued to the respective actuator under multiple circumstances while the real time controller is in the first state, generating, by the real time controller, based on the first high level user-selected action, a first set of one or more lower level commands for a given actuator of the plurality of independently controllable actuators of the robot, wherein the first set of one or more lower level commands is generated pursuant to a first strategy of the distinct set of multiple strategies assigned to the given actuator;

issuing, by the real time controller, the first set of one or more lower level commands to the given actuator to cause the given actuator to perform part of the collective performance of the first high level user-selected action;

generating, by the real time controller, based on the first high level user-selected action and a sensor signal, a second set of one or more lower level commands for the given actuator, wherein the second set of one or more lower level commands is generated pursuant to a second strategy of the distinct set of multiple strategies assigned to the given actuator; and issuing, by the real time controller, the second set of one or more lower level commands to the given actuator to cause the given actuator to continue performing part of the collective performance of the first high level user-selected action.

2. The method of claim 1, wherein the first state further includes an exit condition, and wherein the method further comprises:

determining, by the real time processor, that the exit condition is satisfied; and transitioning, by the real time processor, in a single cycle of the real time processor, the real time processor from the first state to a second state of the state machine in response to determining that the exit condition is satisfied, wherein the second state of the state machine includes a second high level user-selected action to be performed collectively by the plurality of independently controllable actuators of the robot while the real time processor operates in the second state.

3. The method of claim 1, wherein the second strategy is selected based on an origin of the sensor signal.

4. The method of claim 1, wherein the second strategy is selected based on a magnitude associated with the sensor signal.

5. The method of claim 1, wherein the plurality of sets of strategies associated with the first state include:

a first distinct set of at least two strategies that govern a first degree of freedom of movement of the given actuator of the robot; and a second distinct set of one or more strategies that govern a second degree of freedom of movement of the given actuator.

6. The method of claim 5, wherein the first distinct set of strategies governs how the robot exploits the first degree of freedom of movement of the given actuator of the robot while the real time controller operates in the first state, and the second distinct set of one or more strategies governs how the robot exploits the second degree of freedom of movement of the given actuator of the robot while the real time controller operates in the first state.

7. The method of claim 1, wherein the given actuator performs its part of the collective performance of the first high level user-selected action in a manner governed by the first strategy until a sensor begins producing the sensor signal in response to a physical interaction between the robot and an environment in which the robot operates.

8. The method of claim 1, wherein the first strategy is a motion strategy and the second strategy is a force strategy.

9. The method of claim 1, wherein the first and second strategies are force strategies.

10. The method of claim 1, wherein at least one of the first and second strategies is a torque strategy.

11. A robot comprising:
a plurality of independently controllable actuators;
one or more sensors; and
a real time processor operably coupled with the plurality of independently controllable actuators and the one or more sensors, the real time processor configured to:
receive state machine data indicative of a state machine to be implemented autonomously by the real time controller while operating the robot;
identify, based on the state machine data, one or more states reachable by the real time controller during implementation of the state machine, wherein each of the states corresponds to a high level user-selected action, and wherein at least a first state of the one or more states includes:
a first high level user-selected action to be performed collectively by the plurality of independently controllable actuators of the robot while the real time controller is in the first state, wherein the first high level user-selected action was selected by a user from a library of user-selectable actions and corresponding states; and
a plurality of distinct sets of multiple strategies associated with the first high level user-selected action, wherein each distinct set is assigned specifically to a respective actuator of the plurality of independently controllable actuators and governs translation of the first high level user-selected action into one or more lower level commands that are issued to the respective actuator under multiple circumstances while the real time controller is in the first state,
generate, based on the first high level user-selected action, a first set of one or more lower level commands for a given actuator of the plurality of independently controllable actuators of the robot, wherein the first set of one or more lower level commands is generated pursuant to a first strategy of the distinct set of multiple strategies assigned to the given actuator;
issue the first set of one or more lower level commands to the given actuator to cause the given actuator to perform part of the collective performance of the first high level user-selected action;
generate, based on the first high level user-selected action and a sensor signal, a second set of one or more lower level commands for the given actuator, wherein the second set of one or more lower level commands is generated pursuant to a second strategy of the distinct set of multiple strategies assigned to the given actuator; and issue the second set of one or more lower level commands to the given actuator to cause the given actuator to continue performing part of the collective performance of the first high level user-selected action.

12. The robot of claim 11, wherein the first state further includes an exit condition, and wherein the real time processor is further configured to:
determine that the exit condition is satisfied; and
transition, in a single cycle of the real time controller, the real time controller from the first state to a second state of the state machine in response to determining that the exit condition is satisfied, wherein the second state of the state machine includes a second high level user-selected action to be performed collectively by the plurality of independently controllable actuators of the robot while the real time processor operates in the second state.

13. The robot of claim 11, wherein the second strategy is selected based on an origin of the sensor signal or magnitude associated with the sensor signal.

14. The robot of claim 11, wherein the two or more sets of strategies associated with the first state include:
a first distinct set of at least two strategies that govern a first degree of freedom of movement of the given actuator of the robot; and
a second distinct set of one or more strategies that govern a second degree of freedom of movement of the given actuator;
wherein the first distinct set of strategies governs how the robot exploits the first degree of freedom of movement of the given actuator of the robot while the real time processor operates in the first state, and the second distinct set of one or more strategies governs how the robot exploits the second degree of freedom of movement of the given actuator of the robot while the real time processor controller operates in the first state.

15. The robot of claim 11, wherein the given actuator performs its part of the collective performance of the first high level user-selected action in a manner governed by the first strategy until a sensor begins producing the sensor signal in response to a physical interaction between the robot and an environment in which the robot operates.

16. At least one non-transitory computer-readable medium comprising data indicative of a state machine, wherein autonomous implementation of the state machine by a real time controller associated with a robot causes the real time controller to perform the following operations:
identifying, based on the state machine data, one or more states reachable by the real time controller during implementation of the state machine, wherein each of the states corresponds to a user-selected action, and wherein at least a first state of the one or more states includes:
a first high level user-selected action to be performed collectively by a plurality of independently controllable actuators of the robot while the real time controller is in the first state, wherein the first high level user-selected action was selected by the user from a library of user-selectable actions and corresponding states; and
a plurality of distinct sets of multiple strategies associated with the first high level user-selected action, wherein each distinct set is assigned specifically to a respective actuator of the plurality of independently controllable actuators and governs translation of the first high level user-selected action into one or more lower level commands that are issued to the respective actuator under multiple circumstances while the real time controller is in the first state, generating, based on the first high level user-selected action, a first set of one or more lower level commands for a given actuator of the plurality of independently controllable actuators of the robot, wherein the first set of one or more lower level commands is generated pursuant to a first strategy of the distinct set of multiple strategies assigned to the given actuator;

issuing the first set of one or more lower level commands to the given actuator to cause the given actuator to perform part of the collective performance of the first high level user-selected action;

generating, based on the first high level user-selected action and a sensor signal, a second set of one or more lower level commands for the given actuator, wherein the second set of one or more lower level commands is generated pursuant to a second strategy of the distinct set of multiple strategies assigned to the given actuator; and issuing the second set of one or more lower level commands to the given actuator to cause the given actuator to continue performing part of the collective performance of the first high level user-selected action.

17. The at least one non-transitory computer-readable medium of claim 16, wherein the first state further includes an exit condition, and wherein implementation of the state machine by the real time controller further causes the real time controller to perform the following operations:

determining that the exit condition is satisfied; and transitioning, in a single cycle of the real time controller, the real time controller from the first state to a second state of the state machine in response to determining that the exit condition is satisfied, wherein the second state of the state machine includes a second high level user-selected action to be performed collectively by the plurality of independently controllable actuators of the robot while the real time controller operates in the second state.

\* \* \* \* \*